Nov. 9, 1943. H. M. LEWIS Re. 22,390

TELEVISION RECEIVER SYNCHRONIZING SYSTEM

Original Filed March 20, 1939 2 Sheets-Sheet 1

INVENTOR
HAROLD M. LEWIS
BY Laurence B. Dodds
ATTORNEY

TELEVISION RECEIVER SYNCHRONIZING SYSTEM

Original Filed March 20, 1939 2 Sheets-Sheet 2

INVENTOR
HAROLD M. LEWIS
BY Lawrence B. Dodds
ATTORNEY

Reissued Nov. 9, 1943

Re. 22,390

UNITED STATES PATENT OFFICE 22,390

TELEVISION RECEIVER SYNCHRONIZING SYSTEM

Harold M. Lewis, Allenhurst, N. J., assignor to Hazeltine Corporation, a corporation of Delaware Original No. 2,252,599, dated August 12, 1941, Serial No. 262,846, March 20, 1939. Application for reissue March 14, 1942. Serial No. 434,791

24 Claims. (Cl. 178—7.5)

Figure 1:
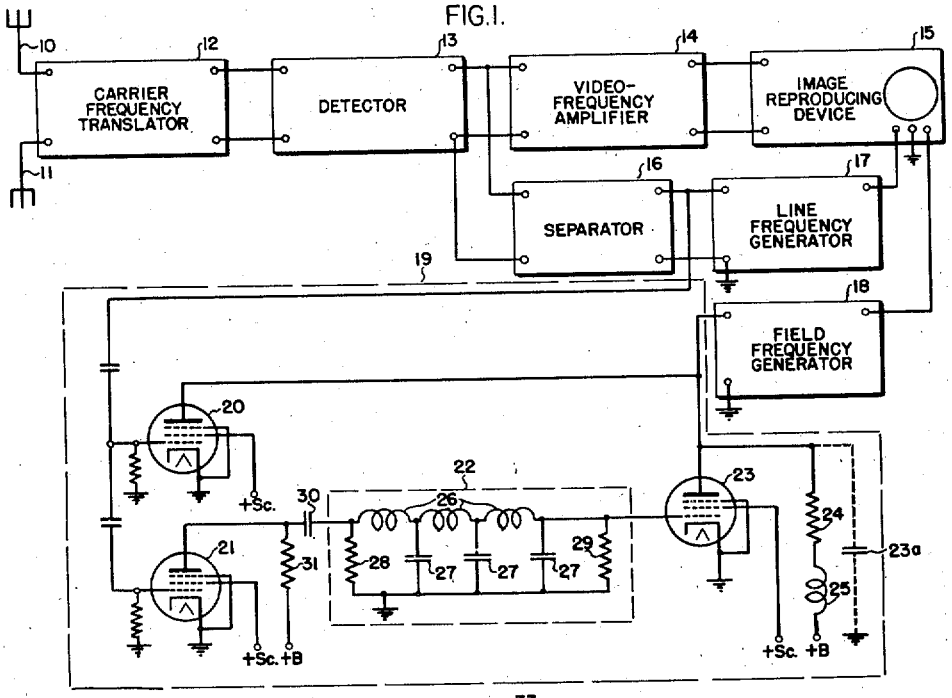

This invention relates to television receivers and particularly to scanning-wave generator synchronizing systems for such receivers.

In television receivers of conventional type, in order to effect scanning of the target of a signal-reproducing device by the scanning beam, saw-tooth current or voltage waves are generated and utilized to produce, respectively, electromagnetic or electrostatic fields of saw-tooth wave form which deflect the beam in two directions normal to each other, thereby to trace upon the target the well-known rectilinear scanning pattern comprising fields of parallel lines. Synchronizing components of the received signal are utilized to control the operation of the scanning-wave generators, thereby to synchronize the scanning action with other related actions in the system. For example, synchronizing impulses or components corresponding to the initiations of successive lines and fields are usually transmitted as a composite synchronizing signal impressed as modulation upon a television carrier wave together with the video-frequency signal. At the receiver, the modulated-carrier wave is detected and the line-synchronizing and field-synchronizing components are separated from the video-frequency signal and from each other and are utilized to synchronize the line-frequency and field-frequency scanning-wave generators with the corresponding apparatus at the transmitter.

It is highly important that the synchronization be accomplished with precision in order that proper scanning may be obtained. This is especially true in scanning systems of the interlaced type, where the field-scanning frequency is not an integral submultiple of the line-scanning frequency so that the lines of one field interlace or fall between the lines of a preceding field and a plurality of successive fields thus constitute a single frame or a single complete image. To obtain a precisely interlaced relation between the successive fields, it is especially important that the field trace scansions be initiated at precisely related intervals and without interference from the line-synchronizing components. The field-synchronizing components must, therefore, be separated from the composite synchronizing signal before they are utilized to synchronize the field-scanning-wave generator. Ordinarily, the field-synchronizing components do not interfere with the proper operation of the line-scanning generator so that the composite synchronizing wave may be applied directly thereto to effect synchronization. The line-synchronizing and field-synchronizing pulses, therefore, are considered to be effectively separated when the field-synchronizing components are derived from the composite wave in a form suitable for use independently of the line-synchronizing components.

It is an object of the present invention, therefore, to provide a television synchronizing system embodying improved means whereby the field-synchronizing components of a composite synchronizing signal may be effectively separated from the line-synchronizing components.

It is a further object of the invention to provide an improved television synchronizing system of the character described whereby there may be developed effectively separated field-synchronizing pulses adapted to synchronize scanning-wave generators at the initiation of both the trace- and retrace-scanning periods.

In accordance with a feature of the present invention, a television receiver synchronizing system, adapted for utilizing a composite synchronizing signal including recurrent line-synchronizing and field-synchronizing components of the same polarity, comprises a synchronizing circuit for a scanning wave generator adapted to be energized by one type of the components. This system also includes means for delaying the composite signal, for a predetermined period such that certain of the synchronizing components of the other type substantially coincide in time with corresponding components of the composite signal without substantially changing the wave form of the delayed signal, and for reversing the relative polarity of the delayed signal with reference to the composite signal. Ths system includes means for combining the delayed-reversed-polarity signal with the undelayed signal to develop a resultant signal comprising effectively separated synchronizing components of the above-mentioned one type with at least certain of the synchronizing components of the other type suppressed, as well as means coupling the combining means to the synchronizing circuit.

The synchronizing circuit of a preferred embodiment of the invention is adapted to be energized at the initiations of both the trace- and retrace-scanning periods by pulses of opposite polarity developed by the combining means. In various different arrangements utilizing the delay circuit mentioned above, and depending on the type of composite synchronizing signal involved, the delay may be for different periods. For example, it may be equal in duration to half of a line-scanning period, to a whole line-scanning period, or to an integral multiple of the line-scanning period, to obtain different desired results.

In the specification and the appended claims, the term "synchronizing-signal component" is employed to describe an amplitude variation of a synchronizing signal which includes a departure from a given value and a subsequent return to such value after a greater or lesser period. A field-synchronizing component may, for example, comprise a continuous pulse or it may be serrated in the conventional manner so that it includes a plurality of adjacent pulses.

For a better understanding of the present invention, together with other and further objects thereof, reference is had to the following description taken in connection with the accompanying drawings, and its scope will be pointed out in the appended claims.

Figure 2:
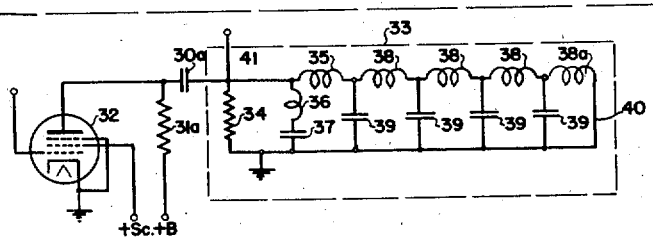
Figure 3:
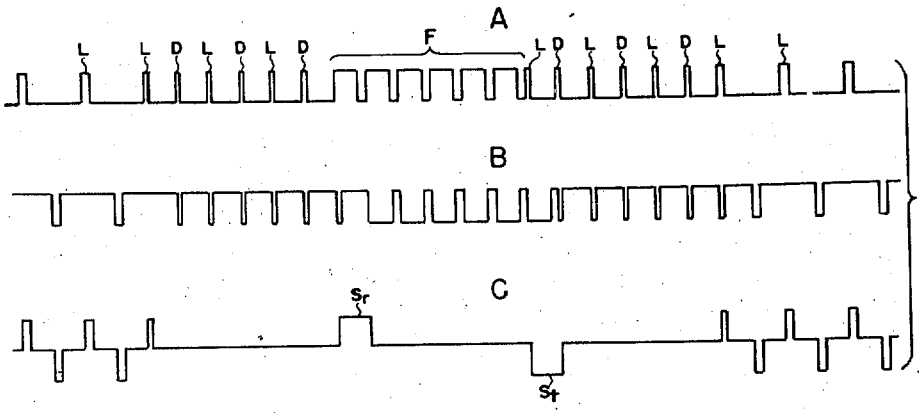
Figure 4:
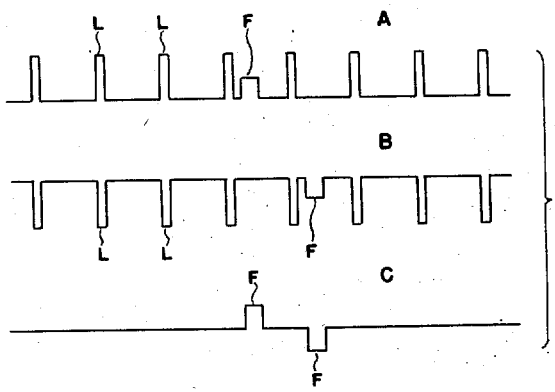
Figure 5:
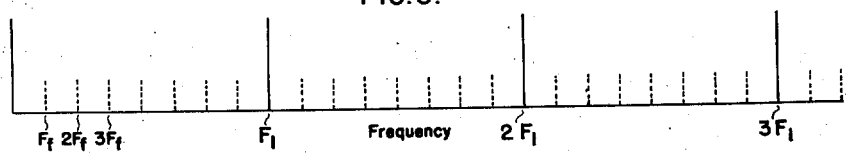
Figure 6:
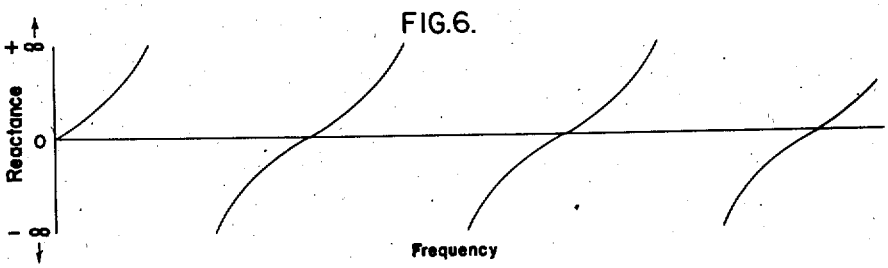
Figure 7:
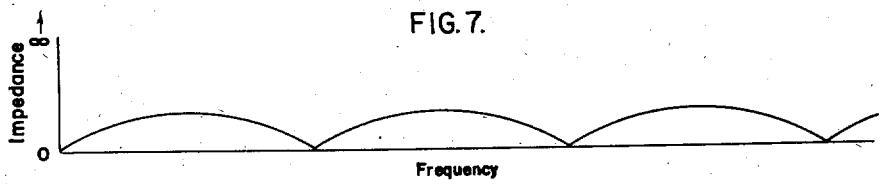

In the accompanying drawings, Fig. 1 is a circuit diagram, partially schematic, of a complete television receiving system including scanning-wave generating and synchronizing apparatus embodying the present invention; Fig. 2 is a circuit diagram of a modified form of the synchronizing apparatus of Fig. 1; Figs. 3 and 4 are groups of curves illustrating the wave forms of synchronizing-signal components utilized and developed in accordance with the present invention, to aid in the understanding thereof; Fig. 5 is a frequency diagram; and Figs. 6 and 7 are curves illustrating certain characteristics of the apparatus shown in Fig. 2.

Referring now more particularly to Fig. 1 of the drawings, there is illustrated a television receiving system which may be of either the tuned radio-frequency or superheterodyne type and including, in cascade, an antenna-ground system 10, 11, a carrier-frequency translator 12, a detector 13, a video-frequency amplifier 14, and an image-reproducing device 15, such as a cathode-ray signal-reproducing tube. Where the receiver is of the superheterodyne type, the conventional frequency changer and intermediate-frequency amplifier are included in the carrier-frequency translator 12. A synchronizing-signal separator 16 is also coupled to the output circuit of the detector 13 and its output circuit is, in turn, coupled directly to a line-frequency scanning-wave generator 17 and, by way of synchronizing separating apparatus, indicated generally at 19 and embodying the present invention, to a field-frequency scanning-wave generator 18. The generators 17 and 18 have their output circuits connected to the scanning elements of the device 15 in conventional manner. The generator 18 may be of a design, such as is shown in applicant's copending application Serial No. 224,023, filed August 10, 1938, and includes a synchronizing or input circuit to which synchronizing wave components may be applied each comprising two pulses of opposite polarity corresponding to the initiations of retrace and trace periods, whereby the generator is synchronized at these times. Those parts of the system indicated in units 10–17, inclusive, may be of any conventional construction and operation.

Since the operation of the system of Fig. 1 as thus far described, excepting the apparatus 19, is, in general, well understood in the art, a detailed description and explanation thereof is unnecessary. Briefly, however, television modulated-carrier waves are intercepted by the antenna 10, 11 and selectively amplified in the carrier-frequency translator 12. Where the receiver is of the superheterodyne type, the signals are impressed on a frequency changer in the translator 12 wherein they are converted into an intermediate-frequency signal and thereupon further selectively amplified. The amplified signal from the translator 12 is delivered to the detector 13 in which there are developed modulation-frequency components including the video-frequency and synchronizing-signal components. The modulation-frequency components are supplied to the video-frequency amplifier 14, wherein they are amplified and from which they are applied in the usual manner to a brilliancy-control element of the reproducing device 15. The modulation-frequency components are also supplied to the separator 16, wherein the composite synchronizing signal is separated from the video-frequency signal. The composite synchronizing signal is applied directly to the line-scanning generator 17 and also to the separating apparatus 19, wherein the field-synchronizing components are effectively separated from the composite signal and from which they are applied to the scanning generator 18. The operations of the generators 17 and 18 are thus synchronized with the corresponding scanning apparatus at the transmitter.

The intensity of the beam of the reproducing device 15 is modulated or controlled in accordance with the video-frequency voltages impressed on its control electrode in the usual manner. Saw-tooth scanning waves are developed by the generators 17 and 18, controlled by the synchronizing-signal components supplied from the units 16 and 19, and are utilized in the conventional manner to deflect the beam, for example, to produce electric fields of saw-tooth wave form which deflect the cathode ray of a signal-reproducing tube, in two directions normal to each other so as to trace the usual rectilinear scanning pattern upon the target of the device, thereby to reconstruct the transmitted picture.

Referring now more particularly to the portion of the system of Fig. 1 embodying the present invention, the television receiver synchronizing system including the separating apparatus 19 preferably comprises a pair of signal-translating channels including, respectively, vacuum-tube amplifiers 20 and 21, preferably of the pentode type, having their input electrodes coupled in parallel to the output circuit of the separator 16. The anode circuit of tube 21 is coupled, by way of a delay filter network 22, to a reversing amplifier tube 23, the tubes 20 and 23 having a common output circuit comprising a resistor 24 and inductance 25 in series. The common output circuit serves as a means for applying synchronizing pulses to the synchronizing circuit of generator 18. A small capacitance 23*a*, comprising in whole or in part the inherent circuit capacitance, may be included in shunt with the output circuit 24, 25. The delay filter network may be of any suitable construction, for example, a ladder filter comprising series-inductance arms 26 and shunt-condenser arms 27 with terminating resistors 28 and 29, as shown. The input terminals of the network 22 are connected across a load resistor 31 of the tube 21 by way of a suitable coupling condenser 30, the output terminals of the network 22 being connected to the input electrodes of the tube 23. The circuit elements of the network 22 may be proportioned to provide a delay of the wave translated thereby of any desired predetermined duration for effecting suppression of undesired components in the composite signal, as will presently be explained. In one case the delay may be equal to the duration of one-half a line-scanning period; in another case, to the duration of a whole line-scanning period; and in other cases, to the duration of an integral multiple of half line-scanning periods or to any other suitable periods.

Proper operating potentials are supplied to the screens of the tubes 20, 21, and 23 from suitable sources indicated at +Sc, while anode potentials are supplied to the tubes 20 and 23 by way of their common output circuit 24, 25 and to the tube 21 by way of the load resistor 31, from suitable sources indicated at +B.

In operation of the apparatus 19, the composite synchronizing signal developed by the separator 16 is impressed on the input circuits of the tubes 20 and 21 and is repeated in their output circuits. The wave form of the composite synchronizing signal as it appears in the output circuit of each of the tubes 20 and 21 of the apparatus 19 may be as represented by curve A of Fig. 3. This particular wave form is one well-known form of composite synchronizing signal and includes recurrent line-synchronizing components or pulses L, recurrent field-synchronizing components F only one being shown, and additional alternate line-synchronizing components D between line-synchronizing components L and adjacent field-synchronizing components F. That is, the alternate components D alternate with the line-synchronizing components for short periods before and after each field-synchronizing component. The field-synchronizing components in this case are of the same polarity as, but of greater duration than, the line-synchronizing and alternate components and are serrated, as shown, so that, in effect, each field-synchronizing component comprises a plurality of successive adjacent pulses. Generator 18 is adapted to be synchronized by one of the types of pulses of the wave from A of Fig. 3, specifically, the field-synchronizing pulses F.

The composite synchronizing signal A is repeated in the output circuits of the tubes 20 and 21 and from the latter tube it is applied to the delay network 22, whereby it is translated with a predetermined delay, for example, a delay equal to the duration of a one-half line-scanning period, a whole line-scanning period, or a multiple of such periods. The delay is such that certain of the synchronizing components of the other type, specifically, line-synchronizing pulses, substantially coincide in time with corresponding components of the original composite signal without substantially changing the wave form of the delayed signal. The delayed wave is thereupon impressed upon the input electrodes of the tube 23 which repeats it in its output circuit with reversed polarity; that is, the relative polarity of the delayed signal with reference to the undelayed composite synchronizing signal is reversed. The delayed - reversed - polarity wave, such as is developed when the delay is equal to one-half the duration of a line-scanning period, is illustrated by curve B in Fig. 3. Since this wave is combined with the undelayed wave in the common output circuit of the tubes 20 and 23, certain of the synchronizing-signal components overlap and thus neutralize each other and there is developed in this common output circuit a resultant wave illustrated by curve C in Fig. 3. It is seen that the line-synchronizing and alternate components, just preceding and following the field-synchronizing components in the delayed and undelayed waves, coincide in timing and, being of opposite polarities, are effectively neutralized or suppressed. Since only the intermediate portions of the field-synchronizing components of the two waves coincide, only such portions are suppressed and the resultant wave therefor includes two separated pulses indicated at $S_r$ and $S_t$ for each field-synchronizing component, which are of opposite polarity and correspond to the initiation of the retrace and trace of the field scansions, respectively. The resultant wave, therefore, may be utilized to energize the synchronizing circuit of the field-scanning generator 18, thereby to synchronize this generator at the initiations of both the trace- and retrace-scanning periods.

Thus, the arrangement of Fig. 1 comprises a television receiver synchronizing system for utilizing the composite synchronizing signal of Fig. 3, curve A, having recurrent line-synchronizing pulses L and recurrent groups of field-synchronizing pulses F. Field-frequency generator 18 includes a synchronizing circuit which responds to pulses of opposite polarity corresponding to the initiations of trace and retrace scanning periods of its scanning cycle, whereby the generator is synchronized at such times. It will be apparent, therefore, that the field-synchronizing generator 18 includes means adapted to synchronize the generator at the initiations of at least one scanning period, such as the retrace scanning period of such cycle. Additionally, it will be seen that synchronizing-signal separating means 19 derives a synchronizing pulse, indicated $S_r$ in curve C of Fig. 3, from only the first one of the pulses of each of the recurrent groups of field pulses, this derived pulse being adapted to control the synchronizing of the retrace scanning period of generator 18. The coupling extending from unit 19 to generator 18 provides means for applying such derived pulses $S_r$ to the synchronizing circuit in order to control the synchronization of retrace scanning periods of the generator.

As is well understood, scanning-wave generators of the types conventionally utilized are synchronized by the application of control pulses thereto just prior to the points of time when they would otherwise independently commence the parts of the cycle of operation which the control pulses initiate. Except for a small portion of a cycle immediately prior to these points of time, the generators are insensitive to control pulses so that, in the case of field-scanning generators, any line-synchronizing components which are not suppressed and which are substantially displaced from the field-synchronizing components do not interfere with the proper synchronization of the field-scanning generator. Where the composite wave does not include alternate pulses it will be appreciated that a delay of a full line-scanning period or an integral multiple of such period, instead of a half-line scanning period as illustrated by curve B in Fig. 3, will result in suppression of all of the line-synchronizing components. Moreover, a full line-period delay may, if desired, be utilized in such a wave as illustrated by curve A in Fig. 3, the only difference in the result being that all the line-synchronizing and alternate pulses, except an alternate pulse at the beginning and end of the period during which the alternate pulses occur, are suppressed and each of the single pulses $S_r$ and $S_t$ is replaced by a field-synchronizing pulse and an adjacent alternate pulse of the same polarity.

The invention may thus be utilized with various different types of composite synchronizing signals and its operation is independent of the relative wave forms of the line-synchronizing and field-synchronizing components of the signal; that is, their durations, wave forms, or amplitudes.

In Fig. 4 curve A illustrates the wave form of a composite synchronizing signal of a particular type which can be utilized only with the separating system of the present invention. Here the field-synchronizing pulses F are of lesser amplitude than the line-synchronizing pulses, so that they cannot be separated by an amplitude-clipper type of amplitude-limiting means. Moreover, these pulses have areas and durations comparable to those of the line-synchronizing pulses so that integrating and duration-responsive devices are not suitable for effecting the separation. For this type of signal the delay circuit of the system of the present invention is proportioned to effect a delay equal to one line-scanning period or an integral multiple thereof. The delayed-reversed-polarity wave, as developed by the system and applied to the combining means, is illustrated by curve B, while curve C illustrates the resultant derived wave with the line-synchronizing pulses suppressed.

In the event that the delay period is not precise, so that the undesired pulses are not completely neutralized, narrow vestigial undesired components in the resultant wave may be effectively by-passed by the capacitance 23*a*, since most of the energy of such components is concentrated in the relatively high-frequency components. Capacitance 23*a*, therefore, comprises means for dissipating residual difference pulses from the combining means including the output circuit of tubes 20 and 23.

Likewise, the invention may be embodied in various different types of filter-delay apparatus. One example of a modified form of the apparatus 19 of Fig. 1 is shown in Fig. 2. Here the apparatus comprises a single input tube 32 and the delay, polarity-reversing, and combining means are embodied in a single dead-end filter circuit indicated generally at 33. The tube 32 may be similar to the tube 21 of Fig. 1 and the filter circuit is coupled across the load resistor 31*a* thereof by a condenser 30*a*. The circuit 33 comprises a low-pass filter including input terminals across which a terminating resistor 34 is connected and to which is coupled an m-derived half-section including a series arm comprising an inductance 35 and a shunt arm comprising a series-connected inductance 36 and condenser 37, and a series of constant-k whole sections individually comprising series-inductance arms 38 and shunt-condenser arms 39, and an additional series-inductance arm 38*a*. The filter is short-circuited at the remote terminals, as indicated at 40.

In the operation of the system of Fig. 2, the composite synchronizing signal is applied to the input electrodes of the tube 32, is repeated in its output circuit, and is applied to the input terminals of the filter 33. Due to the fact that there is an improper termination or mismatching at the end of the filter remote from the input terminals, an electrical wave which is the image of the applied wave is reflected from the short-circuited terminals and appears, after a predetermined delay, across the input terminals. The time delay of the filter is made one-half of the desired time delay, for example, a quarter of a line-scanning period, to effect a desired delay of one-half a line-scanning period in the reflected wave. The resistor 34 terminates the filter at the input terminals in its image impedance so that there is no further reflection of the echo or reflected wave. Since the filter is short-circuited at its remote end, the reflected wave is of opposite polarity to that of the original wave, and, hence, the applied and delayed waves in this case have the same wave forms and phase relation as in the system of Fig. 1 and as illustrated by curves A and B of Fig. 3. Moreover, the resultant wave developed across the resistor 34, which comprises a combination of the delayed and undelayed waves, is as illustrated by curve C in Fig. 3 and may be applied by a suitable lead 41 directly to the synchronizing circuit of the field-frequency generator.

The operation of the system of Fig. 2 may be considered from another aspect with reference to Figs. 5, 6, and 7. It will be appreciated that the synchronizing pulses are represented in the composite signal by frequency components including a fundamental frequency component of, for example, 60 cycles in the case of the field-frequency pulses as well as harmonic-frequency components of 120 cycles, 240 cycles, 480 cycles, etc., in the case mentioned.

Fig. 5 is a frequency scale, indicating at $F_f$ the fundamental frequency of a field-synchronizing pulse, at $2F_f$, $3F_f$, etc., its progressively higher harmonic frequencies, and indicating at $F_l$ a related fundamental frequency of line-synchronizing pulse and at $2F_l$, $3F_l$, etc., its progressively higher harmonic frequencies.

The circuit 33 of Fig. 2 is essentially a two-terminal filter network which couples the tube 32 to the synchronizing or input circuit of the field-frequency scanning-wave generator. In the absence of the resistor 34, the input impedance of the circuit 33 is a pure reactance which varies with frequency between plus and minus infinity, as illustrated by the curve of Fig. 6. This figure is not drawn to scale, but is merely intended to show the critical points. Such a system, as shown, inherently has zero reactance at a particular fundamental frequency and multiples thereof and it behaves as a family of resonant traps connected in parallel branches. It is well-known equivalent of an ideal reflecting transmission line. With the resistor 34 connected across the circuit, as shown, the impedance characteristic of the circuit assumes the form illustrated by the curve of Fig. 7. The circuit thus behaves as a multiple band filter which suppresses or eliminates a particular fundamental frequency component, in the present case, the line-synchronizing fundamental frequency component and its harmonic-frequency components.

While filter systems have heretofore been designed for attenuating the line-frequency components of a composite signal in order to effect separation of the field-frequency pulses, in these systems low-pass filters have been provided having a cutoff frequency slightly less than the line-frequency fundamental component. Such arrangements have necessarily suppressed the high harmonic-frequency components of the field-synchronizing pulses which are essential components of field-synchronizing pulses of the desired rectangular wave form. The arrangement of the present invention, however, while attenuating the fundamental as well as the harmonic-frequency components of the line-synchronizing pulses leaves all of the higher harmonic-frequency as well as the fundamental components of the field-synchronizing pulses, excepting the few which may be coincident with certain of the line-synchronizing components. Here, therefore, separation of the field-frequency synchronizing pulses is obtained by a filter circuit with the wave form of the separated pulses substantially unimpaired.

While there have been described what are at present considered to be the preferred embodiments of this invention, it will be obvious to those skilled in the art that various changes and modifications may be made therein without departing from the invention, and it is therefore, aimed in the appended claims to cover all such cahnges and modifications as fall within the true spirit and scope of the invention.

What is claimed is:

1. A television receiver synchronizing system adapted for utilizing a composite synchronizing signal including recurrent line-synchronizing and field-synchronizing components of the same polarity, comprising a synchronizing circuit for a scanning-wave generator adapted to be energized by one type of said components, means for delaying said composite signal for a predetermined period such that certain of said synchronizing components of the other type substantially coincide in time with corresponding components of said composite signal without substantially changing the wave form of the delayed signal and for reversing the relative polarity of the delayed signal with reference to said composite signal, means for combining the delayed-reversed-polarity signal with the undelayed signal to develop a resultant signal comprising effectively separated synchronizing components of said one type with at least said certain of the synchronizing components of the other type suppressed, and means coupling said combining means to said synchronizing circuit.

2. A television receiver synchronizing system adapted for utilizing a composite synchronizing signal including recurrent line-synchronizing and field-synchronizing components of the same polarity, comprising a synchronizing circuit for a field-frequency scanning-wave generator, means for delaying said composite signal for a predetermined period such that certain of said line-synchronizing components substantially coincide in time with corresponding components of said composite signal without substantially changing the wave form of the delayed signal and for reversing the relative polarity of the delayed signal with reference to said composite signal, means for combining the delayed-reversed-polarity signal with the undelayed signal to develop a resultant signal comprising effectively separated field-synchronizing components with at least said certain of the line-synchronizing components suppressed, and means coupling said combining means to said synchronizing circuit.

3. A television receiver synchronizing system adapted for utilizing a composite synchronizing signal including recurrent line-synchronizing and field-synchronizing components and alternate pulse components between line-synchronizing components adjacent said field-synchronizing components, all of said pulses having the same polarity, comprising a synchronizing circuit for a field-frequency scanning-wave generator, means for delaying said composite signal for a predetermined period equal to the duration of a one-half line-scanning period without substantially changing the wave form of the delayed signal and for reversing the relative polarity of the delayed signal with reference to said composite signal, means for combining the delayed-reversed polarity signal with the undelayed signal to develop a resultant signal comprising effectively separated field-synchronizing components with at least certain of the line-synchronizing and alternate components suppressed, and means coupling said combining means to said synchronizing circuit.

4. A television receiver synchronizing system adapted for utilizing a composite synchronizing signal including recurrent line-synchronizing and field-synchronizing components of the same polarity, comprising a synchronizing circuit for a field-frequency scanning-wave generator, means for delaying said composite signal for a predetermined period equal to the duration of a line-scanning period without substantially changing the wave form of the delayed signal and for reversing the relative polarity of the delayed signal with reference to said composite signal, means for combining the delayed-reversed-polarity signal with the undelayed signal to develop a resultant signal comprising effectively separated field-synchronizing components with said line-synchronizing components suppressed, and means coupling said combining means to said synchronizing circuit.

5. A television receiver synchronizing system adapted for utilizing a composite synchronizing signal including recurrent line-synchronizing and field-synchronizing components of the same polarity, comprising a synchronizing circuit for a field-frequency scanning-wave generator, means for delaying said composite signal for a predetermined period equal to the duration of an integral multiple of a one-half line-scanning period without substantially changing the wave form of the delayed signal and for reversing the relative polarity of the delayed signal with reference to said composite signal, means for combining the delayed-reversed-polarity signal with the undelayed signal to develop a resultant signal comprising effectively separated field-synchronizing components with at least certain of the line-synchronizing components suppressed, and means coupling said combining means to said synchronizing circuit.

6. A television receiver synchronizing system adapted for utilizing a composite synchronizing signal including recurrent line-synchronizing components and field-synchronizing components corresponding in frequency to scanning periods and of the same polarity, comprising a synchronizing circuit for a field-frequency scanning-wave generator adapted to be energized at the initiations of both trace- and retrace-scanning periods by pulses of opposite polarity, means for delaying said signal for a predetermined fraction of the duration of said field-synchronizing components such that certain of said line-synchronizing components substantially coincide in time with corresponding components of said composite signal without substantially changing the wave form of the delayed signal and for reversing the relative polarity of the delayed signal with reference to said composite signal, means for combining the delayed-reversed-polarity signal with the undelayed signal to develop a resultant signal comprising effectively separated field-synchronizing components each including two spaced pulses of opposite polarity corresponding to the initiations of trace and retrace field-scanning periods with at least certain of said line-synchronizing components suppressed, and means coupling said combining means to said synchronizing circuit.

7. A television receiver synchronizing system comprising an input circuit adapted to have impressed thereon a composite synchronizing signal including recurrent line-synchronizing and field-synchronizing components of the same polarity, comprising a synchronizing circuit for a scanning-wave generator adapted to be energized by one type of said components, means coupled to the said input circuit for delaying said composite signal for a predetermined period such that certain of said synchronizing components of the other type substantially coincide in time with corresponding components of said composite signal without substantially changing the wave form of the delayed signal and for reversing the relative polarity of the delayed signal with reference to said composite signal, a combining circuit coupled to said delay and reversing means and to said input circuit for combining the delayed-reversed-polarity signal with the undelayed signal of opposite polarity to develop a resultant signal comprising effectively separated synchronizing components of said one type with at least said certain of the components of the other type suppressed, and means coupling said combining circuit to said synchronizing circuit.

8. A television receiver synchronizing system adapted for utilizing a composite synchronizing signal including recurrent line-synchronizing and field-synchronizing components of the same polarity occurring during predetermined recurrent scanning intervals, comprising a synchronizing circuit for a field-frequency scanning-wave generator adapted to be energized at the initiation of trace- and retrace-scanning periods by pulses of opposite polarity, means for delaying said composite synchronizing signal for a predetermined period such that certain of said line-synchronizing components substantially coincide in time with corresponding components of said composite signal without substantially changing the wave form of the delayed signal and for reversing the relative polarity of the delayed signal with reference to said composite signal, means for combining the delayed-reversed-polarity signal with the undelayed signal of opposite polarity to develop a resultant signal comprising effectively separated field-frequency synchronizing components each including pulses of opposite polarity corresponding to the initiations of trace- and retrace-scanning periods with at least said certain of the line-synchronizing pulses suppressed, and means for coupling said combining means to said synchronizing circuit.

9. A television receiver synchronizing system adapted for utilizing a composite synchronizing signal including recurrent line-synchronizing and field-synchronizing components of the same polarity, comprising a synchronizing circuit for a field-frequency scanning-wave generator, an input circuit, a pair of signal-translating channels connected in parallel to said input circuit, one of said channels comprising a filter network for delaying said signal for a predetermined period such that certain of said line-synchronizing components substantially coincide in time with corresponding components of said composite signal without substantially changing the wave form of the delayed signal and means for reversing the polarity of said delayed signal, a common output circuit for said channels for combining the delayed-reversed-polarity signal translated by said one channel with the undelayed signal translated by the other channel to develop a resultant signal comprising effectively separated field-synchronizing components with at least said certain of the line-synchronizing components suppressed, and means coupling said output circuit to said synchronizing circuit.

10. A television receiver synchronizing system adapted for utilizing a composite synchronizing signal including recurrent line-synchronizing and field-synchronizing components of the same polarity, comprising a synchronizing circuit for a field-frequency scanning-wave generator, an input circuit adapted to have said composite signal impressed thereon, a dead-end filter network having its input terminals coupled to said input circuit and adapted to reflect said composite signal with a predetermined time delay such that certain of said line-synchronizing components substantially coincide in time with corresponding components of said composite signal without substantially changing the wave form of the delayed signal and a reversal in its polarity, an output circuit coupled to said filter network input terminals for deriving a resultant signal comprising a delayed-reversed-polarity signal combined with the undelayed signal providing effectively separated field-synchronizing components, and means coupling said output circuit to said synchronizing circuit.

11. A television receiver synchronizing system adapted for utilizing a composite synchronizing signal including recurrent line-synchronizing and field-synchronizing components of the same polarity, comprising a synchronizing circuit for a field-frequency scanning-wave generator, means for delaying said signal for a predetermined period substantially equal to the duration of an integral multiple of a one-half line-scanning period without substantially changing the wave form of the delayed signal and for reversing the relative polarity of the delayed signal with reference to said composite signal, means for combining the delayed-reversed-polarity signal with the undelayed signal to develop a resultant signal comprising effectively separated field-synchronizing components with at least said certain of the line-synchronizing components suppressed, means for dissipating residual difference pulses from said combining means, and means coupling said combining means to said synchronizing circuit.

12. A television receiver synchronizing system comprising an input circuit adapted to be energized by a composite synchronizing signal including recurrent line-synchronizing and field-synchronizing pulses having fundamental and harmonic-frequency components, a synchronizing circuit for a field-frequency scanning-wave generator adapted to be energized by said field-synchronizing pulses, and frequency-selective means coupling said synchronizing circuit to said input circuit responsive to components of said field-synchronizing pulses including the fundamental component and at least one harmonic component of a frequency higher than the fundamental frequency component of the line-synchronizing pulses, said frequency-selective means being also substantially unresponsive to a plurality of said line-synchronizing components including the fundamental frequency component thereof.

13. A television receiver synchronizing system comprising an input circuit adapted to be energized by a composite synchronizing signal including recurrent line-synchronizing and field-synchronizing pulses having fundamental and harmonic-frequency components, comprising a synchronizing circuit for a scanning-wave generator adapted to be energized by said field-synchronizing pulses, and frequency-selective means coupling said synchronizing circuit to said input circuit effective substantially to suppress line-synchronizing pulse fundamental and harmonic-frequency components without substantially attenuating adjacent field-synchronizing harmonic-frequency components above and below said line pulse fundamental component.

14. A television receiver synchronizing system comprising an input circuit adapted to be energized by a composite synchronizing signal including recurrent line-synchronizing and field-synchronizing pulses having fundamental and harmonic-frequency components, comprising a synchronizing circuit for a scanning-wave generator adapted to be energized by one of said types of pulses, and means coupling said synchronizing circuit to said input circuit comprising a multiple band-pass filter responsive only to synchronizing pulse components of said one of said types including the fundamental component thereof and at least one of the harmonic components thereof separated from said fundamental frequency component by one or more components of the pulses of said other type.

15. A television receiver synchronizing system comprising an input circuit adapted to be energized by a composite synchronizing signal including recurrent line-synchronizing and field-synchronizing pulses having fundamental and harmonic-frequency components, comprising a synchronizing circuit for a scanning-wave generator adapted to be energized by said field-synchronizing pulses, an input circuit adapted to be energized by said composite signal, and means coupling said synchronizing circuit to said input circuit comprising a multiple band-pass filter for translating said signal adapted substantially to suppress said line-synchronizing fundamental frequency components without substantially attenuating adjacent field-synchronizing pulse harmonic-frequency components.

16. A television receiver synchronizing system adapted for utilizing a composite synchronizing signal including recurrent line-synchronizing pulses and recurrent groups of field-synchronizing pulses comprising, pulse-responsive means for synchronizing a field-scanning wave generator at the initiations of at least one scanning period of a scanning cycle, synchronizing-signal separating means for deriving a single pulse from only a particular one of the pulses of each of said recurrent groups of pulses which is adapted to control the synchronizing of said one scanning period, and means for applying said derived pulses to said synchronizing means to control the synchronization of said one scanning period of said generator.

17. A television receiver synchronizing system adapted for utilizing a composite synchronizing signal including recurrent line-synchronizing pulses and recurrent groups of field-synchronizing pulses comprising, pulse-responsive means for synchronizing a field-scanning wave generator at the initiations of at least one scanning period of a scanning cycle, means for applying pulses corresponding to at least said recurrent groups of pulses to said synchronizing means, and means for causing said synchronizing means to be responsive only to a particular pulse of each of said recurrent groups of pulses to control the synchronization of said one scanning period of said generator.

18. A television receiver synchronizing system adapted for utilizing a composite synchronizing signal including recurrent line-synchronizing pulses and recurrent groups of field-synchronizing pulses comprising, pulse-responsive means for synchronizing a field-scanning wave generator at the initiations of at least one scanning period of a scanning cycle, synchronizing-signal separating means for deriving at least one pulse from each of said recurrent groups of pulses and for applying said derived pulses to said synchronizing means to control the synchronization of said generator, and means included in one of said aforementioned means for causing said synchronizing means to be responsive only to a particular pulse of each of said recurrent groups of pulses to control the synchronization of said one scanning period of said generator.

19. A television receiver synchronizing system adapted for utilizing a composite synchronizing signal including recurrent line-synchronizing pulses and recurrent groups of field-synchronizing pulses comprising, pulse-responsive means for synchronizing a field-scanning wave generator at the initiations of at least one scanning period of a scanning cycle, synchronizing-signal separating means for deriving at least one pulse from each of said recurrent groups of pulses and for applying said derived pulses to said synchronizing means to control the synchronization of said generator, and means included in one of said aforementioned means for causing said synchronizing means to be responsive only to the first pulse of each of said recurrent groups of pulses to control the synchronization of said one scanning period of said generator.

20. A television receiver synchronizing system adapted for utilizing a composite synchronizing signal including recurrent line-synchronizing pulses of one polarity and recurrent groups of field-synchronizing pulses of the same polarity comprising, pulse-responsive means for synchronizing a field-scanning wave generator at the initiations of at least one scanning period of a scanning cycle, synchronizing-signal separating means for deriving at least one pulse from each of said recurrent groups of pulses and for applying said derived pulses to said synchronizing means, and means included in one of said aforementioned means for causing said synchronizing means to be responsive only to a particular pulse of each of said recurrent groups of pulses to control the synchronization of said one scanning period of said generator.

21. A television receiver synchronizing system adapted for utilizing a composite synchronizing signal including recurrent line-synchronizing pulses and recurrent groups of field-synchronizing pulses comprising, pulse-responsive means for synchronizing a field-scanning wave generator at the initiations of at least one scanning period of a scanning cycle, synchronizing-signal separating means for deriving at least one pulse from each of said recurrent groups of pulses and for applying said derived pulses to said synchronizing means to control the synchronization of said generator, and means included in said synchronizing-signal separating means for causing said synchronizing means to be responsive only to a particular pulse of each of said recurrent groups of pulses to control the synchronization of said one scanning period of said generator.

22. A television receiver synchronizing system adapted for utilizing a composite synchronizing signal including recurrent line-synchronizing pulses of one polarity and recurrent groups of field-synchronizing pulses of the same polarity comprising, pulse-responsive means for synchronizing a field-scanning wave generator, means for delaying said composite signal for a predetermined period such that certain of said line-synchronizing pulses substantially coincide in time with corresponding pulses of the composite signal without substantially changing the wave form of the delayed signal and for reversing the relative polarity of the delayed signal, means for combining the delayed-reversed polarity signal with the undelayed signal to develop a resultant signal comprising at least one pulse which corresponds to a particular pulse of each of said group of pulses, and means for applying said resultant signal to said synchronizing means to cause said generator to be synchronized in response to said particular pulse.

23. A television receiver synchronizing system adapted for utilizing a composite synchronizing signal including recurrent line-synchronizing pulses of one polarity and recurrent groups of field-synchronizing pulses of the same polarity comprising, pulse-responsive means for synchronizing a field-scanning wave generator at the initiations of at least one scanning period of a scanning cycle, synchronizing-signal separating means for deriving at least one pulse from each of said recurrent groups of pulses and for applying said derived pulses to said synchronizing means to control the synchronization of said generator, and frequency-selective means included in said synchronizing-signal separating means for causing said synchronizing means to be responsive only to a particular pulse of each of said recurrent groups of pulses to control the synchronization of said one scanning period of said generator.

24. A television receiver synchronizing system adapted for utilizing a composite synchronizing signal including recurrent line-synchronizing pulses of one polarity and recurrent groups of field-synchronizing pulses of the same polarity comprising, pulse-responsive means for synchronizing a field-scanning wave generator at the initiations of at least one scanning period of a scanning cycle, synchronizing-signal separating means for deriving at least one pulse from each of said recurrent groups of pulses and for applying said derived pulses to said synchronizing means to control the synchronization of said generator, and a multiple band-pass filter included in said synchronizing-signal separating means for causing said synchronizing means to be responsive only to a particular pulse of each of said recurrent groups of pulses to control the synchronization of said one scanning period of said generator.

HAROLD M. LEWIS.